United States Patent [19]

Ku

[11] Patent Number: 5,788,137
[45] Date of Patent: Aug. 4, 1998

[54] TILTABLE ROLLER ASSEMBLY FOR USE IN A VIDEO CASSETTE RECORDER

[75] Inventor: Yeon-Chung Ku, Seoul, Rep. of Korea

[73] Assignee: Daewoo Electronics Co., Ltd., Rep. of Korea

[21] Appl. No.: 824,482

[22] Filed: Mar. 26, 1997

[30] Foreign Application Priority Data

Mar. 28, 1996 [KR] Rep. of Korea ............ 96-8731

[51] Int. Cl.$^6$ ............ B65H 20/00; B65H 57/14; F16C 17/00
[52] U.S. Cl. ............ 226/194; 226/186; 242/615.2; 384/275
[58] Field of Search ............ 226/190, 194, 226/186; 242/615.2; 384/275, 276, 296

[56] References Cited

U.S. PATENT DOCUMENTS

| | | | |
|---|---|---|---|
| 3,642,229 | 2/1972 | Downey et al. | 226/194 X |
| 4,497,426 | 2/1985 | Osanai . | |
| 4,504,005 | 3/1985 | Moore | 226/190 |
| 4,518,134 | 5/1985 | Oishi et al. | 226/194 X |
| 4,770,550 | 9/1988 | Takahashi . | |
| 4,878,767 | 11/1989 | Halder | 384/275 X |
| 5,143,456 | 9/1992 | Jordens et al. | 384/275 |
| 5,188,272 | 2/1993 | Kanbe et al. | 226/194 X |
| 5,230,569 | 7/1993 | Sheedy | 384/276 |
| 5,373,982 | 12/1994 | Takahashi . | |

FOREIGN PATENT DOCUMENTS 2123200  1/1984  United Kingdom .

Primary Examiner—Michael Mansen
Attorney, Agent, or Firm—Pennie & Edmonds LLP

[57] ABSTRACT

A tiltable roller assembly includes a roller, a sleeve tightly fitted into the roller, a supporting shaft extending through the sleeve, the supporting shaft having a small diameter section and a large diameter section, a rotating member for pivotally carrying the roller and the sleeve about the supporting shaft and a cushion member for allowing the roller and the sleeve to tilt with respect to the supporting shaft. The rotating member has at its periphery an external groove for accommodating the cushion member and a bore through its center and a protruding portion, inwardly extending from an upper end of the bore, for serving to limit the amount of the descent of the rotating member.

4 Claims, 3 Drawing Sheets

1

TILTABLE ROLLER ASSEMBLY FOR USE IN A VIDEO CASSETTE RECORDER

FIELD OF THE INVENTION

The present invention relates to a video cassette recorder; and, more particularly, to an improved pinch roller assembly for use therein having an increased reliability.

BACKGROUND OF THE INVENTION

A video cassette recorder ("VCR") has a pinch roller assembly on a deck thereof for providing stability to magnetic tape running so as to facilitate a video head to read/write information from/onto on the running magnetic tape. In order to let the magnetic tape run at a constant speed and under a proper tension, the pinch roller assembly pivotably mounted on the deck serves to press the running magnetic tape against a capstan shaft adjacent to the pinch roller assembly.

In FIG. 1, there is shown a schematic top view of a deck 10 of, a conventional VCR having a pinch roller assembly 6. As shown, a magnetic tape T runs between a supply reel 1 and a take-up reel 2 passing through a full erasing head 3, a rotating head drum 4 and a capstan shaft 5.

The pinch roller assembly 6 is typically designed to move toward and away from the capstan shaft 5, in the direction indicated by the arrow. During a fast forward or a rewind operation of the VCR, the pinch roller assembly 6 is kept detached from the capstan shaft 5. However, during a recording or reproducing mode of the VCR, the pinch roller assembly 6 moves close to the capstan shaft 5 and presses the running magnetic tape T against the capstan shaft 5.

In the pressing-position of the pinch roller assembly 6, the capstan shaft 5 driven by a capstan motor (not shown) along with the pinch roller assembly 6 exerts a steady rotational friction force on the tape T interposed therebetween. Thus, the tape T runs in a stable manner without incurring any unwanted increase or decrease in the running speed or a severe fluctuating movement.

Further, the rotational friction force of the capstan shaft 5 applies a slight tension to the tape T wrapping around the head drum 4 so that video heads (not shown) on the head drum 4 can read/write a signal from/onto the tape T accurately.

In order for the video heads to read/write the signal from/onto the tape accurately, it is preferred that, when the pinch roller assembly 6 presses the capstan shaft 5, a uniform force be applied along the capstan shaft 5 by the lateral surface of the pinch roller assembly 6.

It is, however, practically difficult to hold a supporting shaft of the pinch roller assembly 6 and the capstan shaft 5 in a perfect parallel relationship with each other while they are operating. Even if the supporting shaft is installed on the deck 10 in a complete parallel relationship with the capstan shaft 5 initially, the pinch roller supporting shaft may become slanted later due to a its own deformation or a twist of a pivot arm supporting the supporting shaft.

When the two shafts are not in a parallel relationship with each other, the tape T is pressed only partially by, for example, an upper or a lower portion of the lateral surface of the pinch roller, rather than by its entire vertical range. This may cause the magnetic tape T to run upwardly or downwardly, deviating from its normal running path, or the surface of the tape T to be damaged by a nonuniform pressing force of the pinch roller assembly.

In FIG. 2, there is shown a longitudinal sectional view of a conventional pinch roller assembly 20.

2

The pinch roller assembly 20 includes a pinch roller 25, a sleeve 30, a supporting shaft 35, a rotating member 40, a cushion member 45, a bushing 50 and a fixing cap 55.

The pinch roller 25 made of a resilient material such as rubber depresses the magnetic tape T against the capstan shaft 5.

The sleeve 30 made of a metal is tightly fitted into the pinch roller 25. The sleeve 30 is formed such that it has an upper inside portion 31, a lower inside portion 32 having a relatively larger diameter than the upper inside portion 31, and a stepped portion 33 demarcating the upper and the lower inside portions 31, 32. Each of the inside portions 31, 32 has a uniform diameter over its entire length.

The supporting shaft 35, which consists of a small diameter section 36, a middle diameter section 37 and a large diameter section 38, is secured to a pivot arm 60 by fixing the lower end portion of the large diameter section 38 thereof in a throughhole 61 of the pivot arm 60.

The rotating member 40, which is made of a synthetic resin and has an external groove 41 at its periphery, is rotatably fitted around the middle diameter section 37 of the supporting shaft 35.

The cushion member 45, which is retained at the external groove 41 of the rotating member 40, provides an automatic pressure regulating capacity against the supporting shaft 35.

The bushing 50 is tightly fitted into the sleeve 30 from underside of the sleeve 30 in such a way that the cushion member 45 is positioned between top of the bushing 50 and the stepped portion 33 of the sleeve 30.

The fixing cap 55 is tightly fitted around the small diameter section 36 of the supporting shaft 35 so that the pinch roller assembly 20 will not come out or slip off and so that the amount of axial displacement thereof will be restricted.

In such a pinch roller assembly, there may occur a slippage between the fixing cap and the rotating member and between the rotating member and the middle diameter section of the supporting shaft. Such slippage is detrimental to ensuring a smooth rotation of the pinch roller and may cause the parts to wear, producing worn-out substances therebetween.

SUMMARY OF THE INVENTION

It is, therefore, a primary object of the invention to provide a pinch roller assembly for use in a video cassette recorder reducing slippages therein.

It is another object of the invention to provide a pinch roller assembly capable of discharging worn-out substances formed between the parts caused by the slippage therein.

In accordance with one aspect of the present invention, there is provided a tiltable roller assembly for use in a video cassette recorder, which comprises: a roller made of a resilient material; a sleeve tightly fitted into the roller, the sleeve including an upper inside portion, a lower inside portion having a relatively larger diameter than the upper inside portion, and a stepped portion between the inside portions; a supporting shaft extending through the sleeve, the supporting shaft having a small diameter section and a large diameter section; a rotation means for pivotally carrying the roller and the sleeve about the supporting shaft, the rotation means having a bore through its center, the bore having a protruding portion inwardly extending from the upper end thereof; a cushion member secured around the rotation means so as to enable the pinch roller and the sleeve to tilt with respect to the supporting shaft; a cylindrical bushing tightly fitted into the sleeve so as to secure the cushion member on the inside portion of the sleeve; and means for restricting the rotation means from being axially displaced; wherein the rotation means is rotatably fitted around the upper part of the large diameter section of the supporting shaft and the protruding portion thereof comes into contact with top of the large diameter section of the supporting shaft.

BRIEF DESCRIPTION OF THE DRAWINGS

The above and other objects and features of the present invention will become apparent from the following description of preferred embodiments, when taken in conjunction with the accompanying drawings, in which.

DETAILED DESCRIPTION OF THE PREFERRED EMBODIMENT

Figure 1:
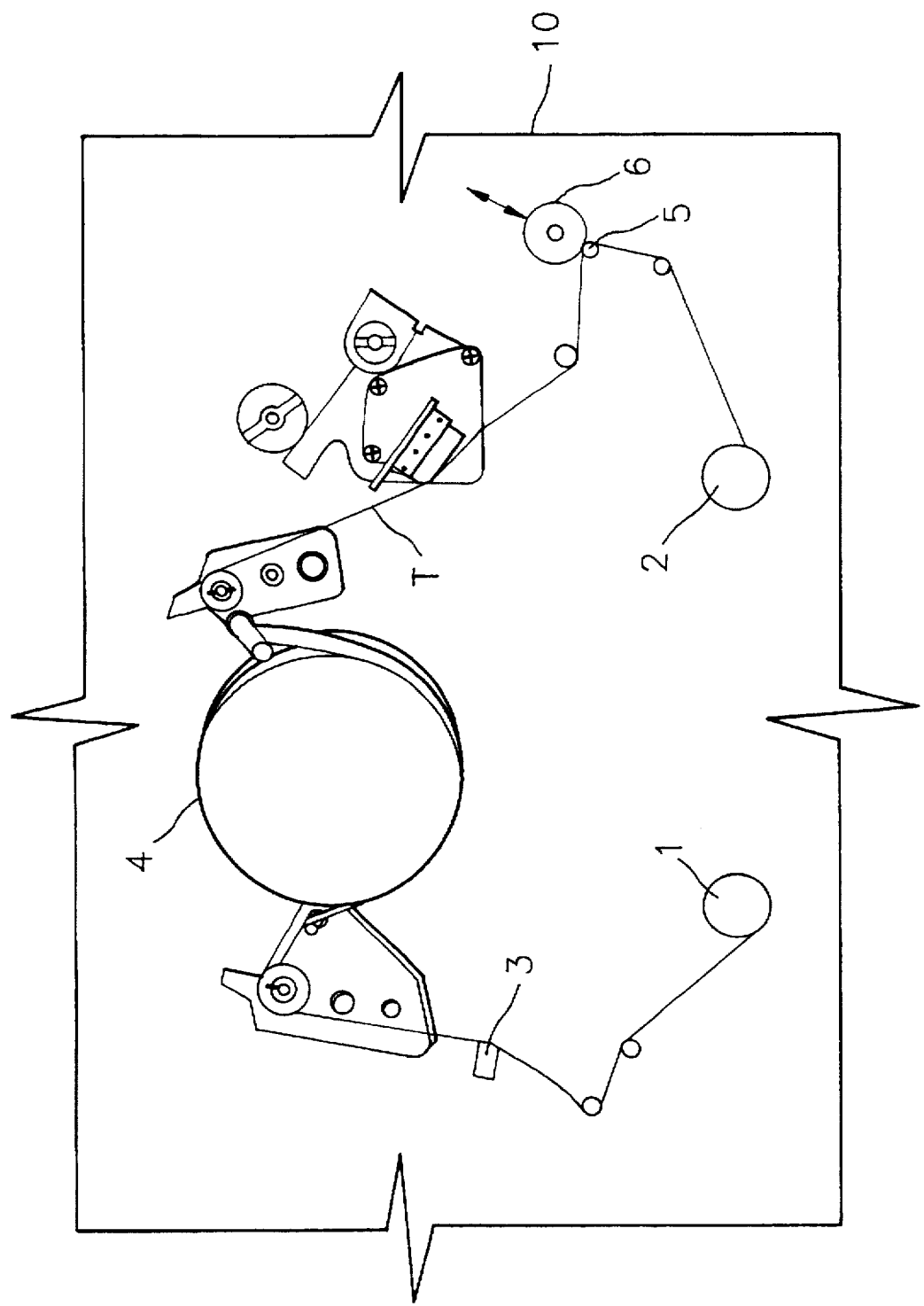
FIG. 1 shows a schematic top view of a deck of a conventional video cassette recorder.
Figure 2:
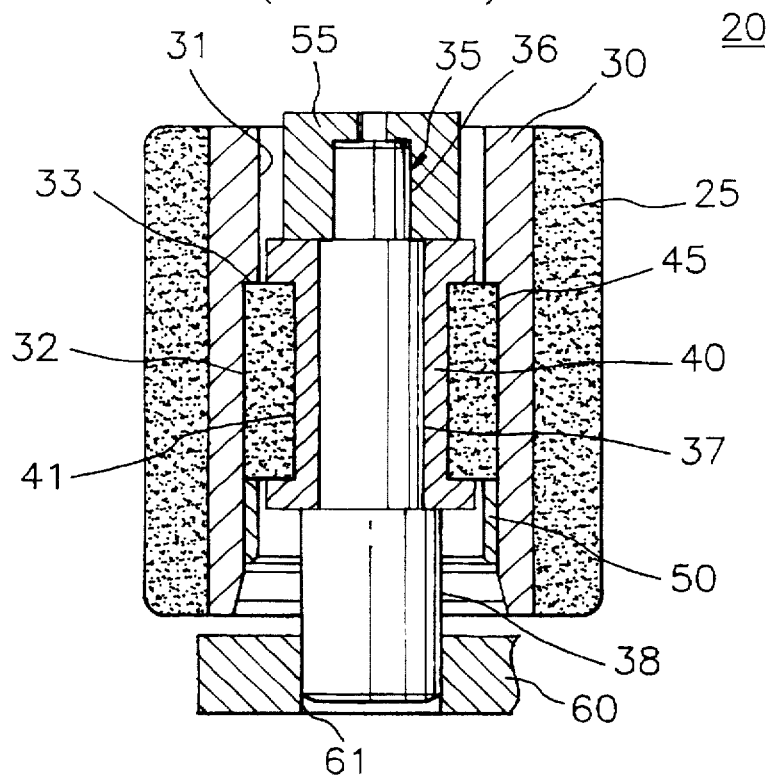
FIG. 2 represents a longitudinal sectional view of a pinch roller assembly in accordance with the conventional invention.

The inventive pinch roller assembly is described with reference to FIGS. 1, 3 and 4.

Figure 3:
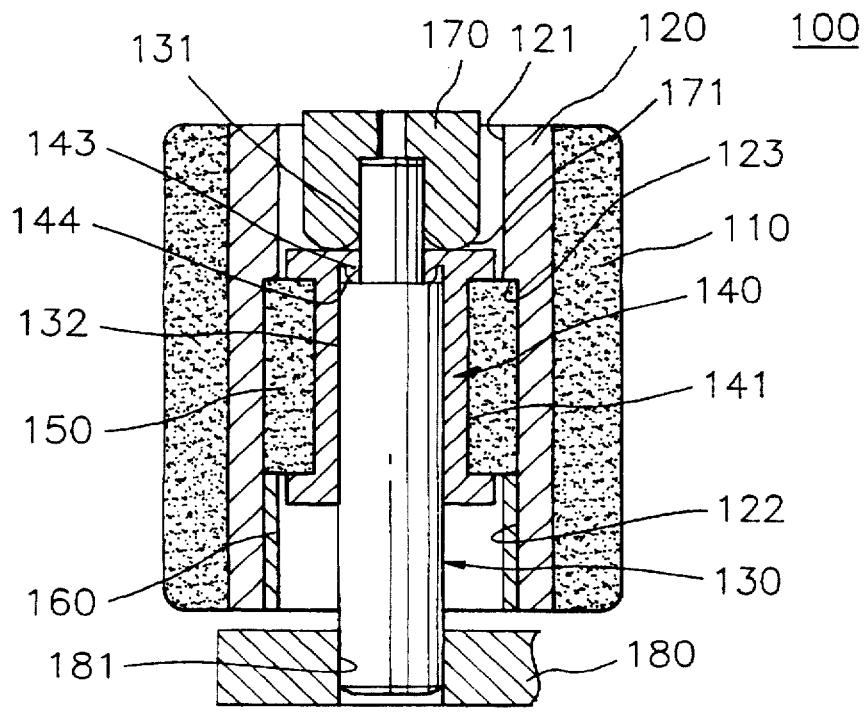
FIG. 3 illustrates a longitudinal sectional view of a pinch roller assembly in accordance with the present invention.

There is shown in FIG. 3 a longitudinal sectional view of pinch roller assembly in accordance with the present invention.

The pinch roller assembly 100 includes a pinch roller 110, a sleeve 120, a supporting shaft 130, a rotating member 140, a cushion member 150, a bushing 160 and a fixing cap 170.

The pinch roller 110, which is made of a resilient material such as rubber, is to depress the magnetic tape T against the capstan shaft 5.

The sleeve 120 made of a metal is tightly fitted into the pinch roller 110 to allow the pinch roller 110 to exert a sufficient pressing force against the capstan shaft 5. The sleeve 120 is formed such that it has an upper inside portion surface 121, a lower inside portion 122 having a relatively larger diameter than the upper inside portion 121, and a stepped portion 123 demarcating the upper and the lower inside portions 121, 122. Each of the inside portions 121, 122 has a uniformed diameter over its entire length.

The supporting shaft 130 extends through the sleeve 120 and has a small diameter section 131 and a large diameter section 132. The supporting shaft 130 is secured to a pivot arm 180 by fixing the lower end portion of the large diameter 132 thereof in a throughhole 181 of the pivot arm 180.

Figure 4:
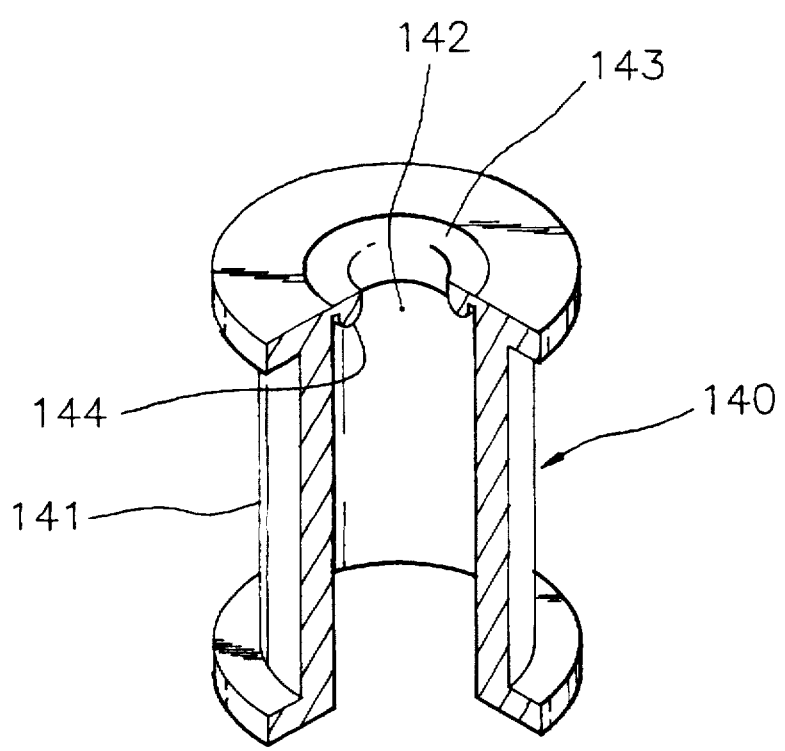
FIG. 4 offers a partially sectional perspective view of a rotating member used in the pinch roller assembly in accordance with the present invention.

On the other hand, as shown in FIG. 4, the rotating member 140 has an external groove 141 at its periphery and a bore 142 through its center. Further, the rotating member 140 has an annular protruding portion 143 inwardly extending from the upper end of the bore 142. The protruding portion 143 serving to limit the amount of the descent of the rotating member 140 has a lower part 144 of a round shape, which minimizes the contact area between the protruding portion 143 and top of the large diameter section 132 of the supporting shaft 130 to reduce frictional resistance when the rotating member 140 is fitted around the large diameter section 132 of the supporting shaft 130.

Returning to FIG. 3, the cushion member 150 for permitting the pinch roller 110 and the sleeve 120 to tilt with respect to the supporting shaft 130 is retained on the external groove 141 of the rotating member 140. The cushion member 150 is formed of a soft rubber which is more resilient than the pinch roller 110. Therefore, the resilience of the cushion member 150 enables the pinch roller 110 to always align with the capstan shaft 5, when the pinch roller 110 depresses the tape T against the capstan shaft 5, even if the supporting shaft 130 is misaligned with the capstan shaft 5.

The rotating member 140, which pivotally carries the pinch roller 110 and the sleeve 120 about the supporting shaft 130 and is made of a synthetic resin, is fitted around the upper part of the large diameter section 132 of the supporting shaft 130 through the bore 142 from above using sliding fit method. At this time, the protruding portion 143 serves to limit the amount of the rotating member 140 descending along the supporting shaft 130 by set over top of the large diameter section 132 of the supporting shaft 130. On the other hand, the upper part of the large diameter section 132 of the supporting shaft 130 functions as a journal for the rotating member 140.

The cylindrical bushing 160 is tightly fitted into the sleeve 120 from underside of the sleeve 120 in such a way that the cushion member 150 is secured between top of the cylindrical bushing 160 and the stepped portion 123 of the sleeve 120 to be attached on the lower inside portion 122 of the sleeve 120.

The fixing cap 170 is tightly fitted around the small diameter section 131 of the supporting shaft 130 in such a way that the rotating member 140 is allowed not to come out or slip off, thereby restricting the fixing cap 170 from being axially displaced. Further, the fixing cap 140 has a lower part 171 having a round shape, which minimizes the contact area between the fixing cap 170 and the rotating member 140 to reduce the frictional resistance.

In such an arrangement, worn-out substances formed between the rotating member and the upper part of the large diameter section of the supporting shaft are downwardly discharged. In addition, the supporting shaft to be used in such a pinch roller is easy to form.

Further, since the contact areas between the rotating member and top of the large diameter section of the supporting shaft and between the rotating member and the fixing cap are reduced, there is a less likelihood occurring slippage during the rotation of the roller.

Although the invention has been shown and described with respect to the preferred embodiments, it will be understood by those skilled in the art that various changes and modifications may be made without departing from the scope of the invention as defined in the following claims.

What is claimed is:

1. A tiltable roller assembly for use in a video cassette recorder, which comprises:

a roller made of a resilient material;

a sleeve tightly fitted into the roller, the sleeve including an upper inside portion, a lower inside portion having a relatively larger diameter than the upper inside portion, and a stepped portion between the inside portions;

a supporting shaft extending through the sleeve, the supporting shaft having a small diameter section and a large diameter section;

a rotating member for pivotally carrying the roller and the sleeve about the supporting shaft, wherein the rotating member has an external groove at its periphery and a bore through its center and a protruding portion, inwardly extending from an upper end of the bore, for serving to limit the amount of the descent of the rotating member, and the rotating member is rotatably fitted around the large diameter section of the supporting shaft in such a way that its protruding portion is set over top of the large diameter section of the supporting shaft;

a cushion member retained on the external groove of the rotating member so as to enable the roller and the sleeve to tilt with respect to the supporting shaft;

a bushing tightly fitted into the sleeve so as to secure the cushion member on the lower inside portion of the sleeve; and a member for restricting the rotating member from being axially displaced.

2. The roller assembly of claim 1, wherein the protruding portion of the rotating member has an annular shape.

3. The roller assembly of claim 1, wherein the protruding portion includes a lower part having a round shape so as to minimize the contact area between the protruding portion and top of the large diameter section of the supporting shaft when the rotating member is fitted around the large diameter section of the supporting shaft.

4. The roller assembly of claim 1, wherein the axial displacement restricting member is fitted around the small diameter section of the supporting shaft and has a lower part having a round shape so as to minimize the contact area between the axial displacement restricting member and top of the rotating member.

* * * * *